UNITED STATES PATENT OFFICE.

ROBERT A. CHESEBROUGH, OF NEW YORK, N. Y.

IMPROVEMENT IN REFINING PETROLEUM BY FILTRATION.

Specification forming part of Letters Patent No. 51,557, dated December 19, 1865.

*To all whom it may concern:*

Be it known that I, ROBERT A. CHESEBROUGH, of the city of New York and State of New York, have discovered and invented the use of Peat-Charcoal for Refining Petroleum by Filtration, of which the following is a specification.

My method of purifying and refining consists in first distilling the crude petroleum in a still with a condensing-worm, such as is ordinarily used for distilling the same.

The products of distillation are benzole, illuminating-oil, and heavy oil, which I then filter, either separately or combined, as follows:

The material I use for filtering through is peat-charcoal, that is made in the ordinary way of making charred peat.

The filter is made of wood or iron of any suitable form and height.

The filter is filled up with the peat-charcoal as high as may be necessary, according to the quality of the oil. The petroleum is run in on top of the filtering material and allowed to filter through the perforated bottom of the filter, when it is collected. The operation is continued by feeding the petroleum-oil into the top of the filter as fast as it runs through the filtering material, until the filtered oil shall begin to assume a dark color, when the operation is suspended and the filter replenished with fresh peat-charcoal.

The petroleum thus refined will be sweet in odor, of a light color, and will need no other treatment.

The crude petroleum from the wells may be purified in this manner without any previous distillation, either for purposes of illumination or lubrication.

What I claim as my invention, and desire to secure by Letters Patent, is—

The use of peat-charcoal, either by itself or in combination with other substances, for purifying or refining petroleum by filtration.

ROBT A. CHESEBROUGH.

Witnesses:
J. FRANKLIN REIGART,
EDM. F. BROWN.